United States Patent [19]

Hayman

[11] 4,175,586

[45] Nov. 27, 1979

[54] FAUCET VALVE WITH DUAL FLOW CONTROL

[75] Inventor: Dennis J. Hayman, Abilene, Tex.

[73] Assignee: Wallace-Murray Corporation, New York, N.Y.

[21] Appl. No.: 817,102

[22] Filed: Jul. 19, 1977

[51] Int. Cl.² ............................................. F16K 25/00
[52] U.S. Cl. .............................. 137/614.11; 137/454.6; 251/174
[58] Field of Search ............ 137/614.11, 454.2, 454.6; 251/310, 209, 174, 120, 304

[56] References Cited

U.S. PATENT DOCUMENTS

| 3,166,097 | 1/1965 | Hinderer et al. | 251/310 |
| 3,324,879 | 6/1967 | Bucknell et al. | 137/454.6 |
| 3,645,493 | 2/1972 | Manoogian et al. | 251/310 |
| 3,780,758 | 12/1973 | DeVries | 137/454.6 |
| 3,913,612 | 10/1975 | Tolnai | 137/454.6 |
| 4,058,289 | 10/1977 | Hicks | 251/310 |
| 4,077,426 | 3/1978 | Karie | 251/174 |

Primary Examiner—Martin P. Schwadron
Assistant Examiner—A. Michael Chambers
Attorney, Agent, or Firm—Wofford, Fails & Zobal

[57] ABSTRACT

Improved faucet valve of the type used for kitchen sinks, lavatories and the like, wherein structure and configurations are disclosed which permit faucet valve size reduction toward minimums with consequent savings in materials, while at the same time achieving effective flow control and maintaining structural integrity.

12 Claims, 23 Drawing Figures

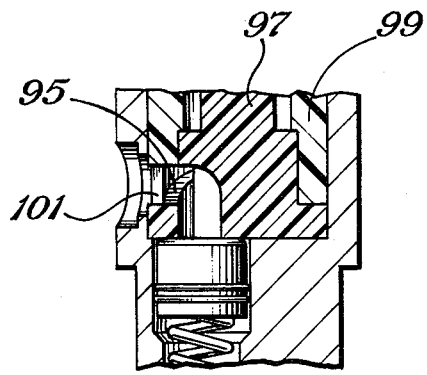
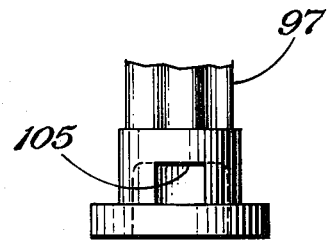
Fig.17  Fig.18
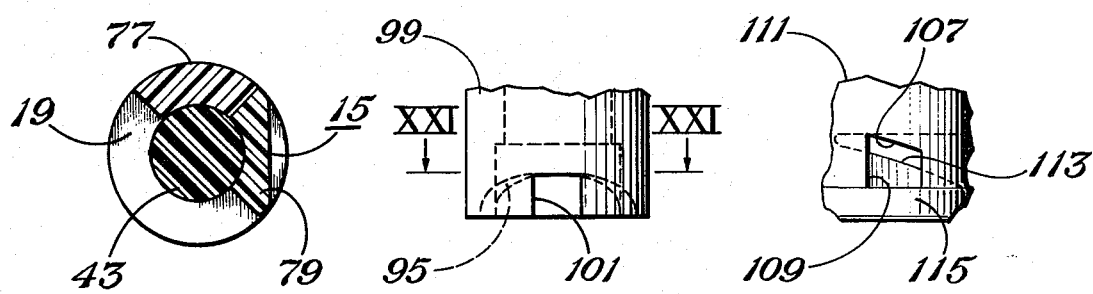
Fig.23  Fig.20  Fig.22
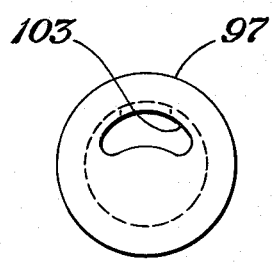
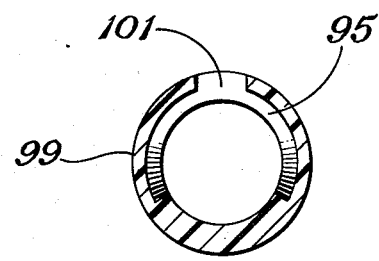
Fig.19  Fig.21

FAUCET VALVE WITH DUAL FLOW CONTROL

FIELD OF THE INVENTION

The invention relates to faucet valves of the type used for kitchen sinks, lavatories, bathtubs, showers, and the like; and more particularly to improved structure and fluid flow control for such faucet valves.

BACKGROUND OF THE INVENTION

The function of a faucet valve, of course, is to deliver water from a source in a desired manner. The faucet valve must be effective to turn the water "off" and "on" and to control the water volume. In addition, the faucet valve should be durable and be easy to manipulate. Also important is the cost of manufacture. It is apparent that cost of manufacture may be decreased by reducing the size of the faucet valve, with consequent savings of materials. However, as faucet valve size approaches minimums, other problems arise or become more pronounced. A type of faucet valve in common use, and the type to which the present invention is particularly applicable, has a bottom inlet and a side discharge, with the flow control function being performed at the inlet by cooperation of a control member having a control opening of suitable shape cooperating with the inlet opening. Faucet valves of this type in common use are exemplified by U.S. Pat. No. 3,645,493. Particular interrelated problems that become pronounced as faucet valve size approaches minimums are those of flow control and the associated structure.

It is accordingly the object of this invention to provide a faucet valve of the type herein above mentioned having improved flow control and associated structure.

For a further understanding of the invention and further objects, features, and advantages thereof, reference may now be had to the following description, taken in conjunction with the accompanying drawings.

BRIEF DESCRIPTION OF THE DRAWINGS

FIG. 17 is a fragmentary section view similar to FIG. 9 but showing a further embodiment of the invention.

FIG. 18 is a fragmentary front elevational view of the control member shown by FIG. 17.

FIG. 19 is a bottom view of the control member of FIG. 18.

FIG. 20 is a fragmentary front elevational view of the retainer member shown by FIG. 17.

FIG. 21 is a section view taken at lines XXI—XXI of FIG. 20.

FIG. 22 is a fragmentary front elevational view similar to FIG. 10 but illustrating a still further embodiment of the invention.

FIG. 23 is a section view taken at XXIII—XXIII of FIG. 1.

DESCRIPTION OF PREFERRED EMBODIMENT

Figure 1:
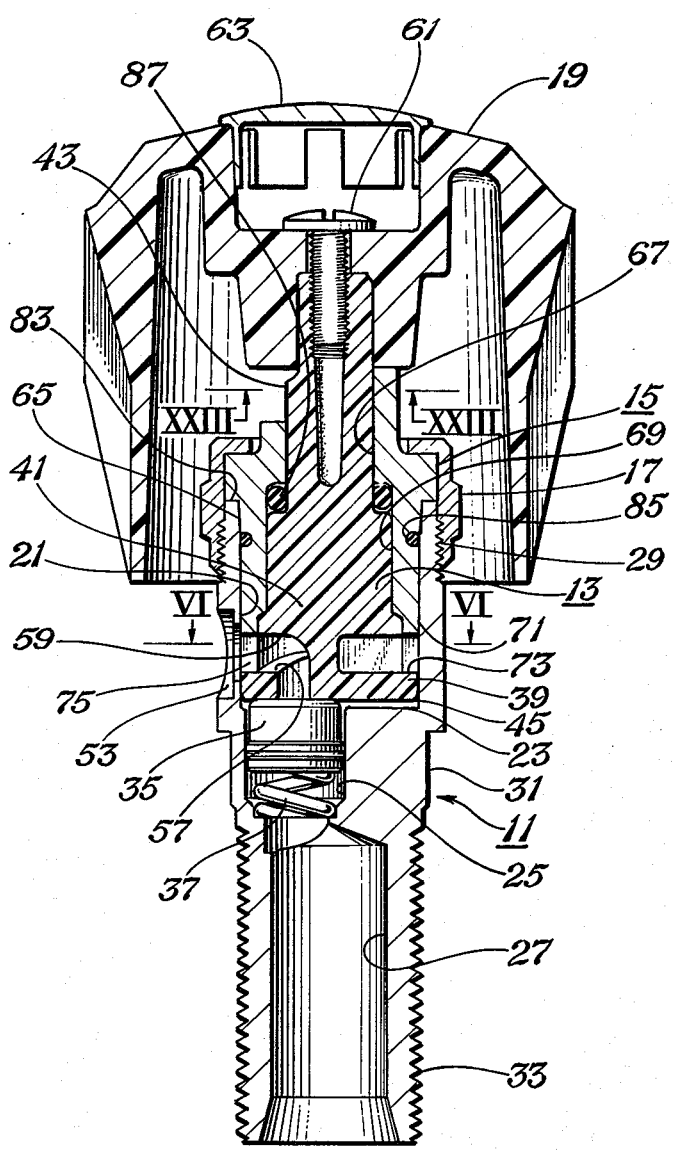
FIG. 1 is a longitudinal section view showing the entire assembly for a single faucet valve in accordance with a preferred embodiment of the invention and showing the faucet valve in the full open position.
Figure 3:
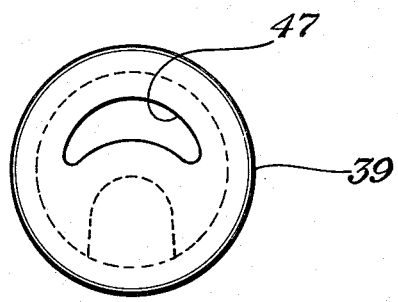
FIG. 3 is a bottom view of the control member of FIG. 2.
Figure 2:
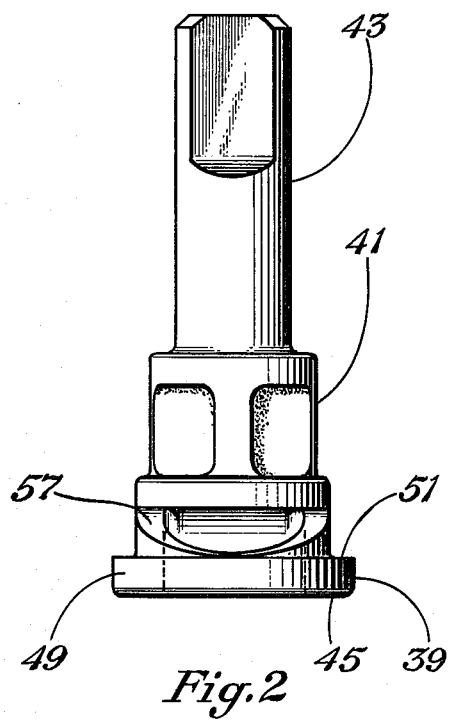
FIG. 2 is a front elevational view of the valve control member.
Figure 4:
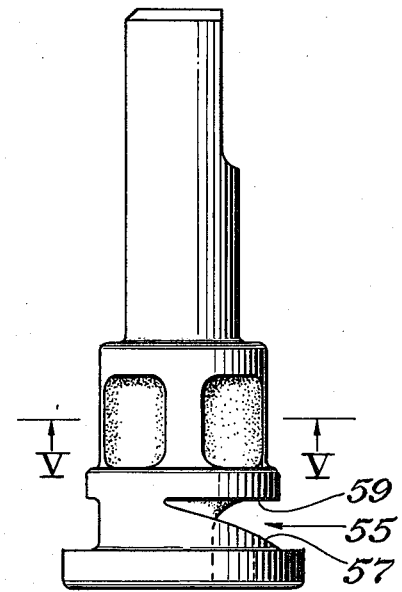
FIG. 4 is a side view of the control member of FIG. 2.
Figure 5:
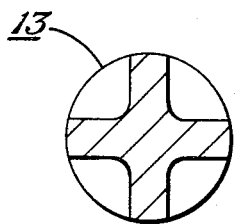
FIG. 5 is a section view, taken at V—V, of FIG. 4.

FIGS. 1-4 illustrate the faucet valve of the invention in accordance with a preferred embodiment. The faucet valve assembly (see FIG. 1) includes a valve body 11, a control member 13, a retainer member 15, a bonnet nut 17, and a handle 19.

The valve body is generally cylindrical and has a first central bore portion which forms a cylindrical cavity having a side wall 21, a bottom wall 23 and an open top. An inlet opening 25 communicates with the cylindrical cavity via the bottom wall 23 and also with a second valve body central bore portion 27, which in turn communicates with a fluid supply source (not shown). The valve body exterior is of conventional form and includes a threaded portion 29 at its upper end for receiving the bonnet nut 17, a central portion 31 to be received by a conventional deck mount or the like (not shown), and a threaded portion 33 at its lower portion for receiving deck mount retainer parts and connections to a fluid supply source (not shown). The valve body 11 has an outlet opening 53 communicating with the valve body cylindrical cavity via the side wall 21.

The valve body inlet opening 25 receives a conventional inlet seal means in the form of a resilient seal element 35 which is urged upwardly by a spring 37 to contact the bottom surface of the control member 13.

The control member 13 is generally cylindrical and includes a control disc portion 39 merging with a body portion 41 which merges with a stem portion 43.

The control disc portion 39 is generally disc shaped and is received in mating relation by the valve body cylindrical cavity side wall 21, and has a substantially planar bottom surface 45 which engages the seal element 35 of the inlet opening seal means. The control disc portion 39 is provided a first control opening 47 of a predetermined configuration for cooperation or coaction with the inlet opening seal means. The first control opening 47 has the conventional "kidney" shape, and is eccentric with respect to the valve body central axis, as is the inlet opening 25. The control disc portion 39 has a larger diameter than the body portion 41 so as to provide a flange 49 having an upwardly facing seating surface 51 for a purpose to be hereinafter explained.

The control member body portion 41 has what may be termed a notch 55 in a side thereof. The notch has a ramp portion 57 and a roof portion 59. The ramp portion 57 has a helical configuration and merges at its bottom with the control disc portion upper surface and extends upwardly therefrom in opposite directions to merge with the roof portion. The cavity formed by the notch 55 communicates with the first control opening 47. The roof portion 59 is shaped to provide smooth transition of fluid flow direction.

The control member stem portion 43 has a smaller diameter than the body portion 41 and receives a conventional handle 19 at its outer end portion. The handle 19 is retained on the stem portion 43 by the usual screw 61, and the handle screw receiving cavity is closed by the usual plug button 63.

The retainer member 15 has a generally cylindrical shape and has an exterior surface 65 that is received in mating relation by the valve body cylindrical cavity side wall 21. The retainer member 15 has also a central bore the upper portion 67 of which is received in mating relation by the control member stem portion 43 and a lower portion 69 of which is received in mating relation by the control member body portion 41. The central bore lower portion 69 forms with a lower portion of the retainer member exterior surface 65 a retainer member skirt portion 71 having a downwardly facing bottom surface 73 which is disposed in mating relation to the control disc flange upwardly facing seating surface 51. The retainer skirt portion 71 has a rectangular second control opening 75 therein which communicates with the valve body outlet opening 53.

A projection 77 on the handle 19 coacts with stop means 79 on the retainer member 15 to permit 180° of handle rotation and hence 180° of control member rotation (see FIG. 23). 180° of rotation permits the faucet valve to move from the full closed to the full opened position, utilizing one side of the ramp 57. The ramp 57 extends in opposite directions from a center point, and the retainer member 15 has oppositely disposed second control openings 75 so that the faucet valve may be moved either clockwise or counter clockwise from the full closed to full opened positions, depending upon the orientation of the retainer member 15. The retainer member orientation is determined by the position of orientation projections 81 on the retainer member 15 with respect to orientation slots 83 in the valve body 11.

Sealing between the retainer member 15 and the valve body 11 and between the retainer member 15 and the control member 13 is provided by respective O-rings 85, 87.

Figures 15, 16:
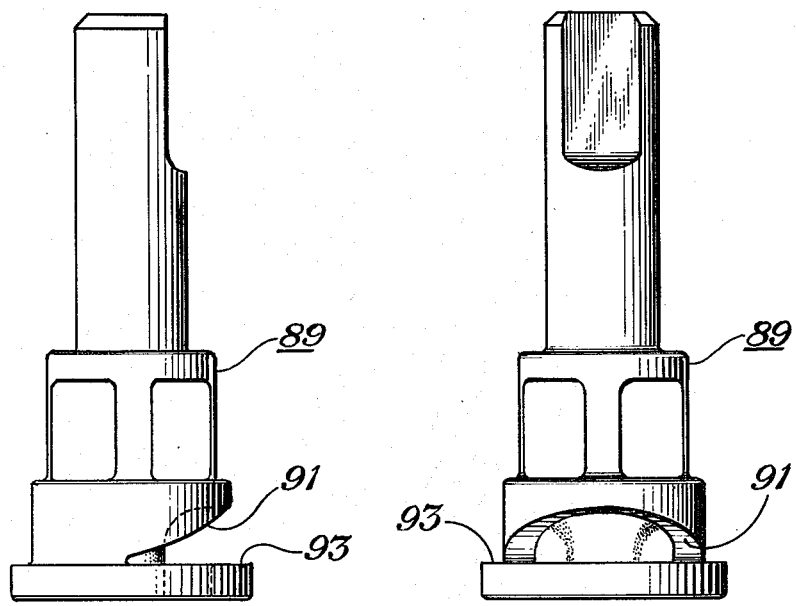
FIGS. 15 and 16 are side elevational views and front elevational views, respectively, of the valve control member in accordance with another embodiment of the invention.

In the embodiment shown by FIGS. 15 and 16, the control member 89 is like that of FIGS. 1–14 except that the ramp portion 91 has a downwardly facing surface and extends upwardly from the level of the control disc seating surface 93 to a center point.

In the embodiment shown by FIGS. 17–21, the ramp portion 19 is not on the control member 97 but is on the interior wall of the retainer member 99, with the retainer member having a rectangular opening 101 communicating with the valve body outlet opening 103 at the region of the ramp portion center point. The control member is provided a rectangular opening 105 coacting with the ramp portion 95 and communicating with the first control opening 103.

Figure 6:
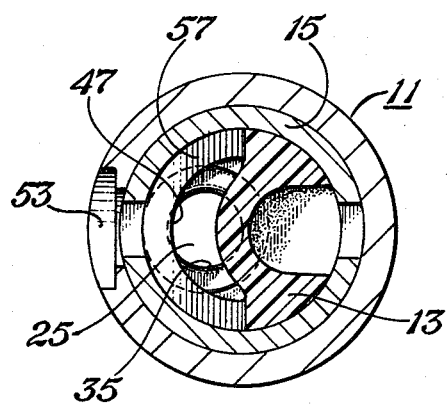
FIG. 6 is a section view, taken at VI—VI, of FIG. 1 and showing the faucet valve in full open position.
Figure 7:
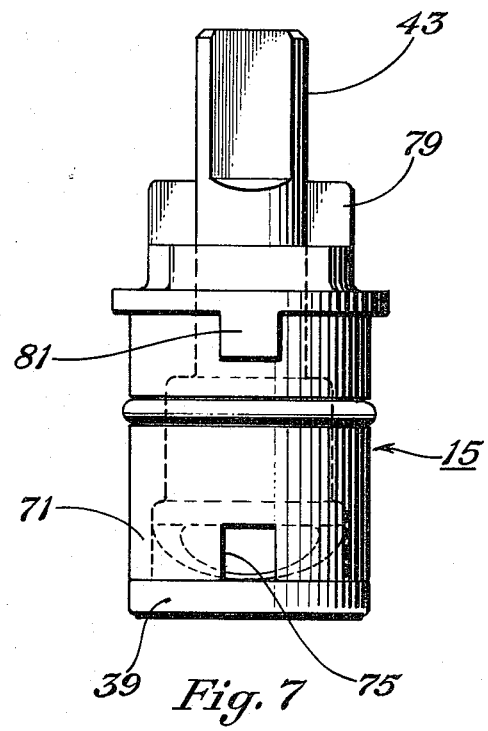
FIG. 7 is a front elevational view showing the valve control member and its associated retainer member, with the faucet in the full open position.
Figure 8:
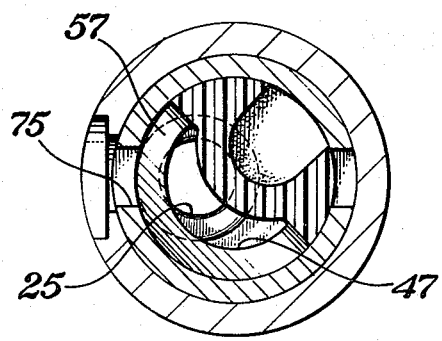
FIG. 8 is like FIG. 6, but with the faucet valve shown at an intermediate open position.
Figure 9:
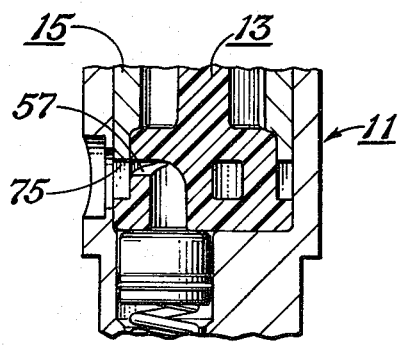
FIG. 9 is a fragmentary section view of a portion of FIG. 1, but showing the faucet valve in the position corresponding to that shown in FIG. 8.
Figure 10:
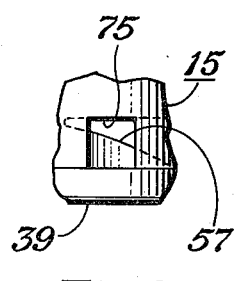
FIG. 10 is a fragmentary front elevational view of FIG. 7, but showing the faucet valve in the position of FIGS. 8 and 9.
Figure 11:
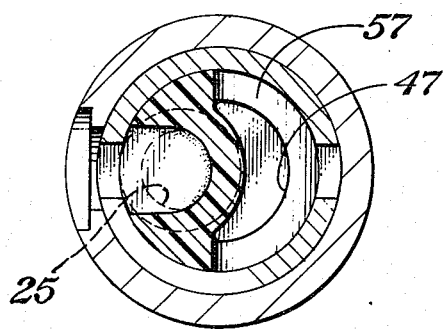
FIGS. 11, 12 and 13 correspond with FIGS. 8, 9 and 10, but show the faucet valve in the fully closed position.
Figure 12:
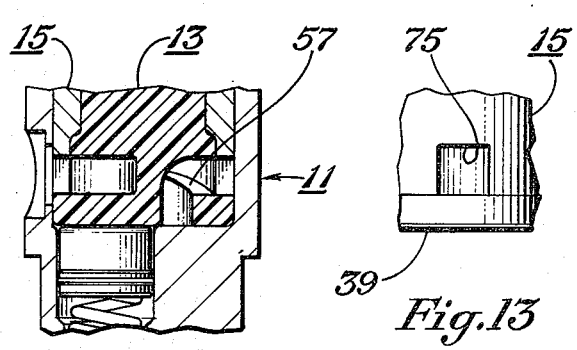
Figure 13:
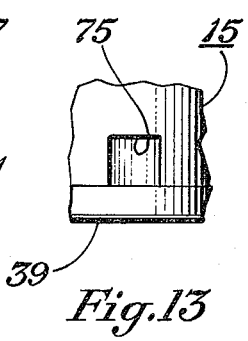
Figure 14:
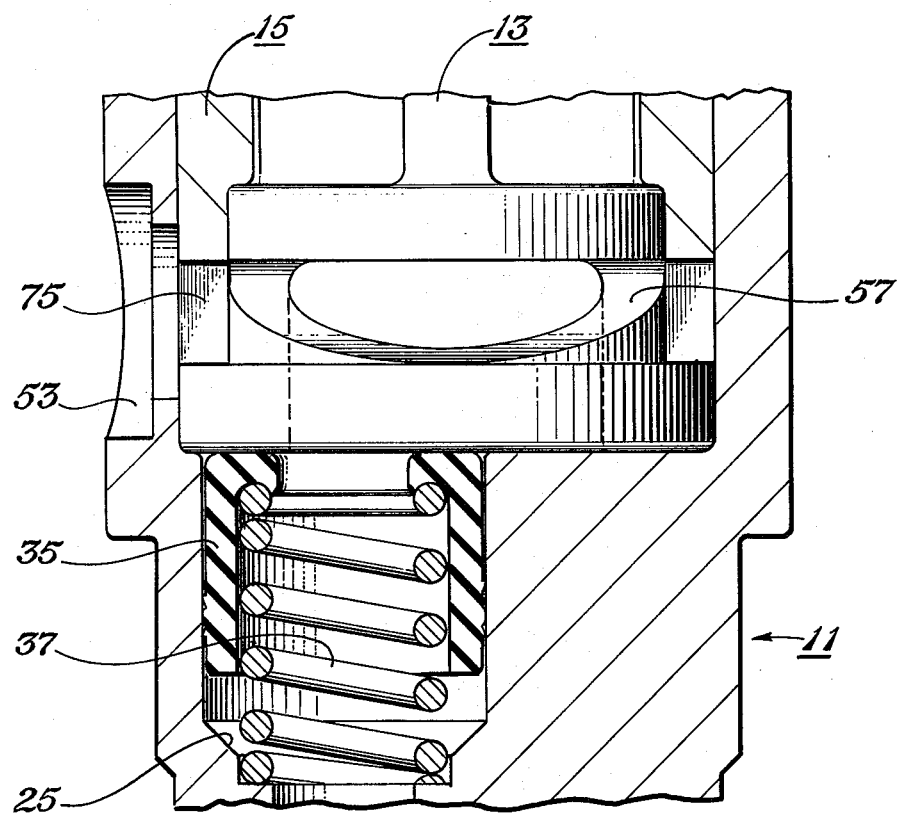
FIG. 14 is an enlarged fragmentary section view showing the lower end of the valve control member and the associated retainer member and the valve body, including the inlet seal structure.

The operation of the faucet valve of the invention may be conveniently explained with reference to FIGS. 1 and 6–13. In FIGS. 1, 6 and 7, the faucet valve is shown in the fully open position. It can be seen, from FIG. 6, that a maximum area of the first control opening 47 is exposed to the inlet opening 25, and it can be seen, from FIGS. 1 and 7, that the maximum area of the second control opening 75 is exposed by the ramp portion 57 of the control member 13. In FIGS. 8–10, the control member 13 has been rotated about 45° in the counter clockwise direction from the full open position of FIGS. 1, 6 and 7. It can be seen, from FIG. 8, that an intermediate area of the first control opening 47 is now exposed to the inlet opening 25, and it can be seen, from FIGS. 9 and 10 that an intermediate area of the second control opening 75 is now exposed by the ramp portion 57 of the control member 13. In FIGS. 11–13, the control member 13 has been rotated 180° in the counter clockwise direction from the full open position of FIGS. 1, 6, 7. It can be seen, from FIG. 11, that no area of the first control opening 47 is now exposed to the inlet opening 25, and it can be seen, from FIGS. 12 and 13, that no area of the second control opening 75 is now exposed by the ramp portion 57 of the control member 13.

Reduction of faucet valve sizes to save materials is desirable. One limiting factor in the extent to which size reduction can be accomplished is flow control. With the conventional single flow control means, as the physical dimensions of the coacting flow control components are reduced, the effectiveness of the flow control is diminished. The present invention eliminates this flow control problem by the provision of two flow control means instead of one.

Reduction of faucet valve size and the provision of a second flow control means involves the interrelated problem of structural integrity, particularly as to the control member and retainer member which are made from plastic materials such as acetal which do not have great structural rigidity. The particular structure and configurations of the control member and retainer member, as shown and described herein, effectively deal with the problem of structural integrity.

While in the embodiments shown, the first control means utilizes a "kidney"-shaped opening coacting with a circular opening, and the second control means utilizes a rectangular opening coacting with a helical ramp, it will be apparent to those skilled in the art that there are numerous coacting control opening configurations that may be employed to affect various desired flow control patterns.

In accordance with one aspect of the present invention, as illustrated by FIG. 22, the upper surface 107 of the second control opening 109 in the retainer member 111 is given a contour which corresponds with that of the ramp portion 113 of the control member 115. The effect of this arrangement is to achieve a significant fluid flow noise reduction.

The foregoing disclosure and the showings made in the drawings are merely illustrative of the principles of this invention and are not to be interpreted in a limiting sense.

I claim:
1. A faucet valve comprising:
 a. a valve body having a cylindrical cavity with a sidewall, a bottom wall and an open top;
 b. an inlet opening communicating with said cavity via said bottom wall and including inlet seal means, and an outlet opening communicating with said cavity via said sidewall;

c. a generally cylindrical control member including a control disc portion merging with a body portion which merges with a stem portion;
  i. said control disc portion having an enlarged diameter portion forming a flange with an upwardly facing seating surface and a substantially planar bottom surface disposed to engage said inlet seal means, and a first control opening of a predetermined configuration for cooperation with said inlet seal means, and with said flange merging with said substantially planar bottom surface;
  ii. said body portion having a side opening of predetermined configuration communicating with said first control opening;
d. a generally cylindrical retainer member having an exterior surface that is received in mating relation by the said valve body cylindrical cavity sidewall, and having a central bore an upper portion of which is received in mating relation by said control member stem portion and a lower portion of which is received in mating relation by said control member body portion;
  i. said central bore lower portion forming with a lower portion of the retainer member exterior surface a retainer member open ended skirt portion having a downwardly facing bottom surface disposed in mating relation with said flange upwardly facing seating surface;
  ii. said retainer member skirt portion having an opening therein of predetermined configuration disposed for cooperation with said control member body portion side opening and communicating with said outlet opening;
whereby, rotation of said control member about its longitudinal axis controls fluid communication between said inlet and outlet opening, first by coaction of said first control opening with said inlet opening and second, by coaction of said control member body portion side opening, said retainer member skirt portion opening and said outlet opening.

2. The faucet valve of claim 1, wherein the opening in said retainer member skirt portion is generally rectangular, and the control member body portion side opening is generally rectangular, and there is provided on the interior wall of said retainer member adjacent its opening a ramp portion of predetermined configuration, so that said ramp portion coacts with said control member side opening to control fluid flow.

3. A faucet valve comprising:
a. a valve body having a cylindrical cavity with a sidewall, a bottom wall and an open top;
b. an inlet opening communicating with said cavity via said bottom wall and including inlet seal means, and an outlet opening communicating with said cavity via said sidewall;
c. a generally cylindrical control member including a control disc portion merging with a body portion which merges with a stem portion;
  i. said control disc portion having an enlarged diameter portion forming a flange with an upwardly facing seating surface and a substantially planar bottom surface disposed to engage said inlet seal means, and a first control opening of a predetermined configuration for cooperation with said inlet seal means, and with said flange merging with said substantially planar bottom surface;
  ii. said body portion having a notch in a side thereof, with the notch having a ramp portion and a roof portion, with the ramp portion having a predetermined configuration and merging at its bottom with the control disc portion upwardly facing seating surface and at its top with said roof portion, with the cavity formed by said notch communicating with said first control opening;
d. a generally cylindrical retainer member having an exterior surface that is received in mating relation by the said valve body cylindrical cavity sidewall, and having a central bore an upper portion of which is received in mating relation by said control member stem portion and a lower portion of which is received in mating relation by said control member body portion;
  i. said central bore lower portion forming with a lower portion of the retainer member exterior surface a retainer member open ended skirt portion having a downwardly facing bottom surface disposed in mating relation with said flange upwardly facing seating surface;
  ii. said retainer member skirt portion having a second control opening of predetermined configuration therein; disposed for cooperation with said control member body portion side opening and communicating with said outlet opening;
whereby, rotation of said control member about its longitudinal axis controls fluid communication between said inlet and outlet opening, first by coaction of said first control opening with said inlet opening and second, by coaction of the control member body portion, side opening, said second control opening and said outlet opening.

4. The faucet valve of claim 3 wherein the configuration of said second control opening is generally rectangular.

5. The faucet valve of claim 4 wherein said upper surface of said second control opening has a contour which corresponds with that of said ramp portion.

6. The faucet valve of claim 5 wherein said ramp portion is helical.

7. The faucet valve of claim 3 wherein the ramp portion of said control member notch is inverted and the configuration of said second control opening is generally rectangular.

8. A faucet valve comprising:
a. a valve body having a cylindrical cavity with a sidewall, a bottom wall and an open top;
b. an inlet opening communicating with said cavity via said bottom wall and including inlet seal means, and an outlet opening communicating with said cavity via said sidewall;
c. a generally cylindrical control member including a control disc portion merging with a body portion which merges with a stem portion;
  i. said control disc portion being received in mating relation by said valve body cylindrical cavity sidewall and having a substantially planar bottom surface engaging the inlet opening seal means, and a first control opening of a predetermined configuration for cooperation with said inlet opening seal means;
  ii. said control disc portion having a larger diameter than said body portion so as to provide a flange having an upwardly facing seating surface, with said flange merging with said substantially planar bottom surface;

iii. said body portion having a notch in a side thereof, with the notch having a ramp portion and a roof portion, with the ramp portion having a predetermined configuration and merging at its bottom with the control disc portion upwardly facing seating surface and at its top with said roof portion, with the cavity formed by said notch communicating with said first control opening;

d. a generally cylindrical retainer member having an exterior surface that is received in mating relation by the said valve body cylindrical cavity sidewall, and having a central bore an upper portion of which is received in mating relation by said control member stem portion and a lower portion of which is received in mating relation by said control member body portion;

i. said central bore lower portion forming with a lower portion of the retainer member exterior surface a retainer member open ended skirt portion;

ii. said retainer member skirt portion having a downwardly facing bottom surface disposed in mating relation to said control disc flange upwardly facing seating surface;

iii. said retainer member skirt portion having a second control opening of predetermined configuration therein; disposed cooperation with said control member body portion side opening and communicating with said outlet opening;

whereby rotation of said control member about its longitudinal axis controls fluid communication between said inlet and outlet opening, first by coaction of said first control opening with said inlet opening and second, by coaction of the control member body portion side opening said second control opening and said outlet opening.

9. The faucet valve of claim 8 wherein the configuration of said second control opening is generally rectangular.

10. The faucet valve of claim 9 wherein the upper surface of said second control opening has a contour which corresponds with that of said ramp portion.

11. The faucet valve of claim 10 wherein said ramp portion is helical.

12. The faucet valve of claim 8 wherein the ramp portion of said control member notch is inverted and the configuration of said second control opening is generally rectangular.

* * * * *